(12) United States Patent
Ehlen

(10) Patent No.: US 10,132,428 B1
(45) Date of Patent: Nov. 20, 2018

(54) CABLE MANAGEMENT CLIP

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/654,659

(22) Filed: Jul. 19, 2017

(51) Int. Cl.
F16L 3/13 (2006.01)
F16L 3/127 (2006.01)

(52) U.S. Cl.
CPC ............... F16L 3/127 (2013.01); F16L 3/13 (2013.01)

(58) Field of Classification Search
CPC ..................................... F16L 3/13; F16L 3/127
See application file for complete search history.

(56) References Cited

U.S. PATENT DOCUMENTS

| | | | | |
|---|---|---|---|---|
| 2,948,940 A * | 8/1960 | Degener | ............... | F16L 3/13 248/316.7 |
| 3,262,662 A * | 7/1966 | Gastaldi | ............... | H02G 3/26 248/68.1 |
| 3,584,348 A * | 6/1971 | Soltysik | ............... | F16L 3/13 248/68.1 |
| 4,971,273 A * | 11/1990 | Huerre | ............... | H01J 29/003 248/71 |
| 5,743,451 A * | 4/1998 | Kahn | ............... | A45F 5/02 224/268 |
| 6,340,317 B1 * | 1/2002 | Lin | ............... | H01R 9/2416 174/60 |
| 6,621,714 B1 * | 9/2003 | Li | ............... | F16L 3/23 174/191 |
| 8,746,633 B1 * | 6/2014 | Medlin, Jr. | ............... | F16L 3/00 174/481 |
| 9,072,364 B2 * | 7/2015 | Johnson | ............... | A45F 5/02 |
| 9,590,402 B2 * | 3/2017 | Lawrence | ............... | F16L 3/04 |
| 2012/0145838 A1 * | 6/2012 | Chiu | ............... | H02G 3/32 248/74.2 |
| 2014/0263871 A1 * | 9/2014 | Rouleau | ............... | F16L 3/00 248/68.1 |

OTHER PUBLICATIONS

U.S. Appl No. 15/647,199 for Ehlen, J. filed Jul. 11, 2017.

* cited by examiner

Primary Examiner — Anita M King
(74) Attorney, Agent, or Firm — FisherBroyles, LLP

(57) ABSTRACT

Technology is provided for a cable management clip. The cable management clip includes a base portion and one or more cable control fingers. The base portion includes a first side configured to confront a mounting surface and a second side opposite the first side. One or more apertures are formed through the base portion and positioned to receive a corresponding mounting feature of the mounting surface, such as a bridge lance. The cable control fingers each include an arcuate first end portion extending away from the second side of the base portion, a middle portion extending parallel to the base portion, and a second end portion positioned to retain one or more cables between the cable control fingers and the mounting surface.

19 Claims, 5 Drawing Sheets

US 10,132,428 B1

CABLE MANAGEMENT CLIP

TECHNICAL FIELD

This patent application generally relates to data storage server configurations, and more specifically, to cable management.

BACKGROUND

Many servers and other computer systems contain components housed in a component rack in sliding drawers, which allows a user to easily access and replace the components. Conventionally, cables are connected to the sliding drawer to provide power and/or communication to components in the drawer. The flexibility of the cables allows the cable to remain connected when the drawer is slid out of the rack. However, the cables must be as long as the desired travel length of the tray. Thus, if access to the entire length of the sliding drawer is desired, the cables must be at least as long as the length of the drawer. Therefore, when the drawers are closed there can be excess cable length that needs to be stowed out of the way of the components and other drawers, for example. In conventional component rack configurations, the excess cable length is typically managed by strapping the cables to the rack's vertical cable trays with cooperative hook and loop straps (e.g., Velcro®). However, removal of the cables from these straps can be difficult within the confines of the rack and pose a significant inconvenience when accessing the drawers and/or replacing components in the component rack.

BRIEF DESCRIPTION OF THE DRAWINGS

Embodiments of the cable management clips disclosed herein may be better understood by referring to the following Detailed Description in conjunction with the accompanying drawings, in which like reference numerals indicate identical or functionally similar elements.

Figure 1:
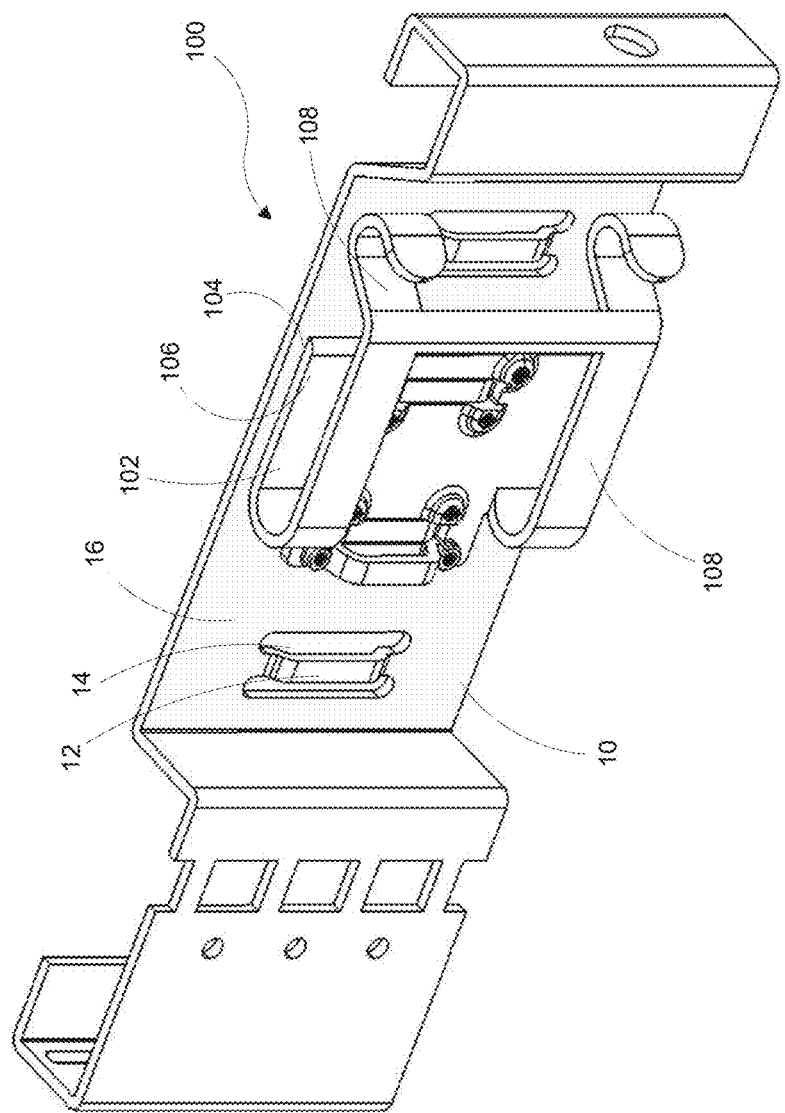
FIG. 1 is an isometric view of a cable management clip, according to a representative embodiment, attached to a vertical cable tray of a rack.

The headings provided herein are for convenience only and do not necessarily affect the scope or meaning of the claimed embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, equivalents, and alternatives falling within the scope of the embodiments as defined by the appended claims.

DETAILED DESCRIPTION

Overview

Cable management clips are disclosed. In a representative embodiment, a cable management clip includes a base portion and a pair of cable control fingers. The base portion can include a first side configured to confront a mounting surface (e.g., the cable tray of a rack) and a second side opposite the first side. In some embodiments, one or more apertures are formed through the base portion and positioned to receive a corresponding mounting feature of the mounting surface, such as a bridge lance. The pair of fingers can each include an arcuate first end portion extending away from the second side of the base portion, a middle portion extending parallel to the base portion, and a second end portion having a retainer segment extending at an obtuse angle from the middle portion. In some embodiments, the second end portion includes a lead-in tab at least a portion of which extends parallel to the retainer segment. In some embodiments, a transverse member extends between the pair of fingers, to facilitate grasping the fingers for insertion and removal of cables under the fingers. In some embodiments, a plurality of threaded inserts are secured to the base portion adjacent the one or more apertures to facilitate attachment of the clip to the mounting surface with threaded fasteners, for example.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 shows a cable management clip 100, according to a representative embodiment, mounted to a mounting surface 16 of a component rack cable tray 10. The cable management clip 100 attaches to mounting features on the rack 10, such as bridge lances 12. A bridge lance is a typical mounting feature found in component racks and comprises a strip of material 12 formed between two slots 14 which is deformed away from the surface 16 of the material. As will be explained more fully below, the cable management clip 100 can include features designed to engage these or other mounting feature configurations. The cable management clip 100 includes a base portion 102 having a first side 104 configured to confront the mounting surface 16 and a second side 106 opposite the first side 104. The cable management clip 100 also includes a pair of cable control fingers 108 extending from the base portion 102 and being spaced apart from the second side 106 of the base portion to retain one or more cables between the cable control fingers 108 and the mounting surface 16. The disclosed cable management clip 100 consolidates various cables in a small storage area within the cable tray 10. The disclosed cable management clip 100 also facilitates access to components within a drawer. For example, a user can slide a drawer in, lift the fingers 108, and position loose cables under the fingers 108 where they are retained. When pulling the drawer out, the user can again lift the fingers 108 and remove a desired length of cable to allow the drawer to move out to its extended position for maintenance or other servicing.

Figure 2:
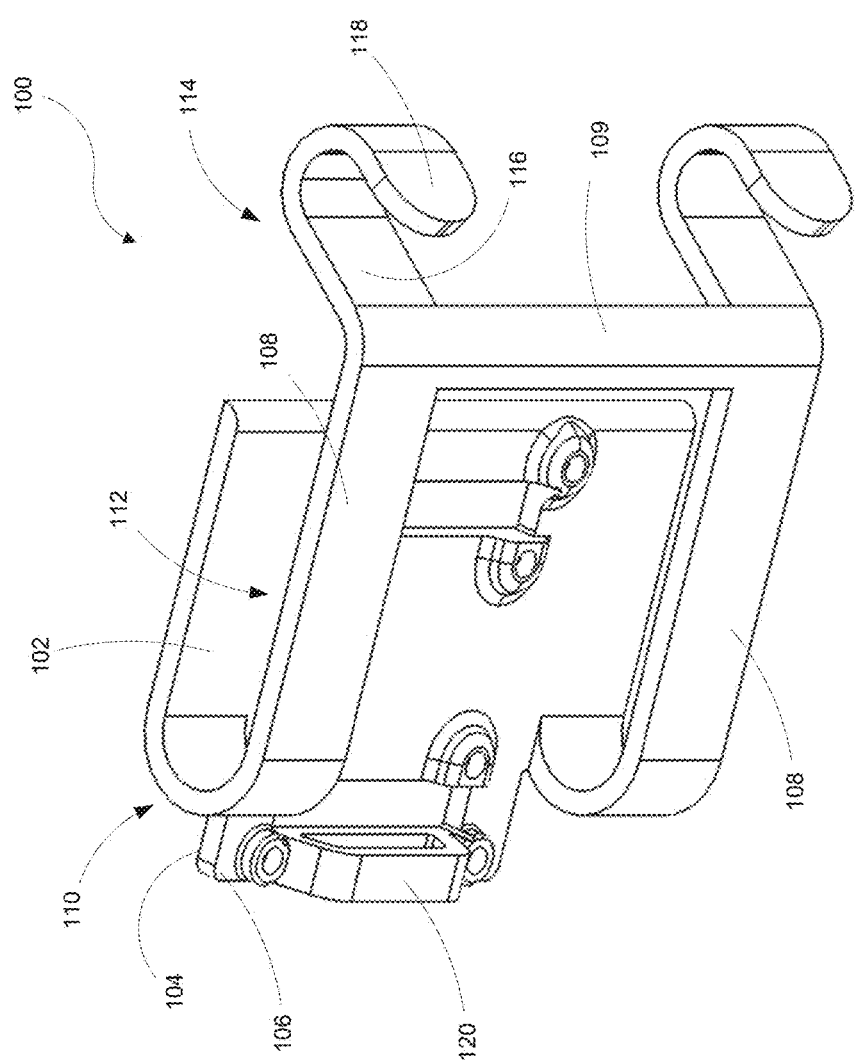
FIG. 2 is an enlarged isometric view of the cable management clip as viewed from the top.

As shown in FIG. 2, the cable control fingers 108 can each include an arcuate first end portion 110 extending away from the base portion 102. In the illustrated embodiment, the arcuate end portion is generally U-shaped with one end portion attached to the base portion 102 and the other end attached to a middle portion 112 spaced apart from and extending parallel to the base portion 102. The middle portion 112 is attached at its distal end to a second end portion 114 generally opposite the arcuate first end portion 110. In some embodiments, the second end portion 114 can include a retainer segment 116 extending at an obtuse angle (FIG. 7, angle A) from the middle portion 112. A curved lead-in tab 118 is attached to the retainer segment 116, and at least a portion of the lead-in tab 118 extends parallel to the retainer segment 116. In some embodiments, the lead-in tab 118 extends arcuately from the retainer segment 116. In some embodiments, a transverse member 109 extends between the fingers 108 adjacent to the retainer segments 116 to facilitate grasping the fingers 108 for insertion and removal of cables under the fingers 108. The transverse member 109 also provides structural rigidity to the spaced apart cable control fingers 108.

In some embodiments, the base portion 102 can include one or more elongate hoops 120, which are configured similar to a bridge lance 12 (FIG. 1). In some embodiments, the elongate hoops 120 extend parallel to the transverse member 109. The hoops 120 can be used with conventional cooperative hook and loop straps (not shown) to provide additional cable control. In some embodiments, the base portion 102, the fingers 108, the transverse member 109, and the hoop 120 can be comprised of a unitary molded construction (e.g., molded plastic). In other embodiments, the base portion 102, the fingers 108, the transverse member 109, and the hoop 120 can comprise formed (e.g., bent, cut, and/or stamped) sheet metal.

Figure 3:
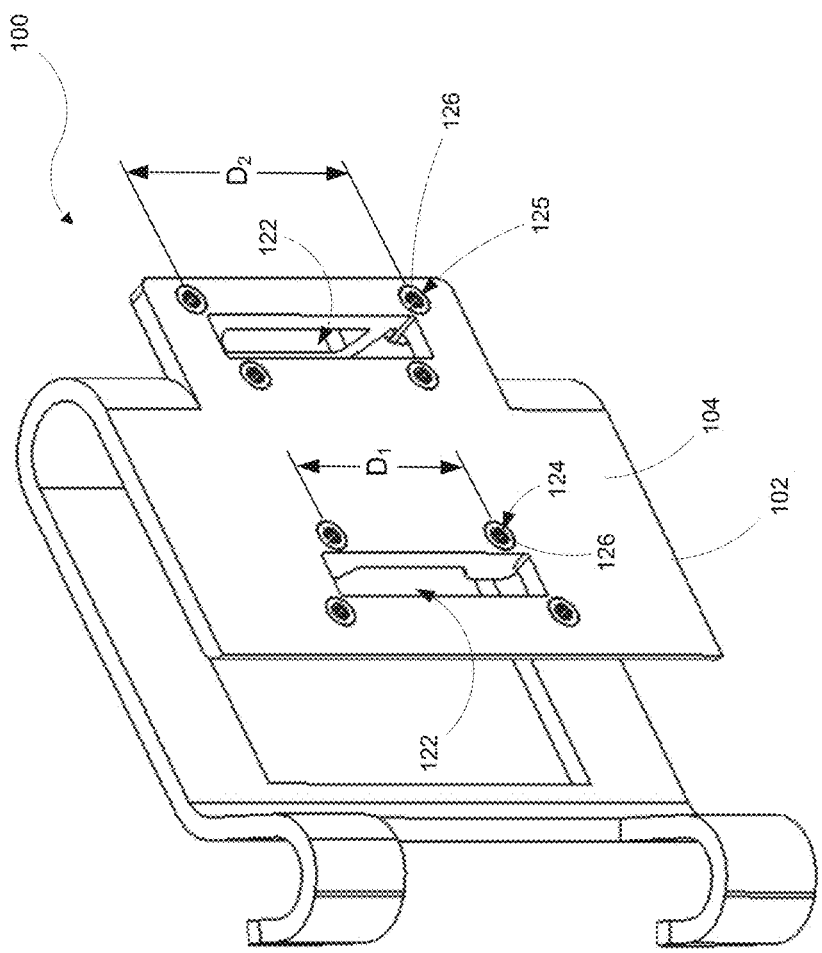
FIG. 3 is an enlarged isometric view of the cable management clip as viewed from the bottom.
Figure 4:
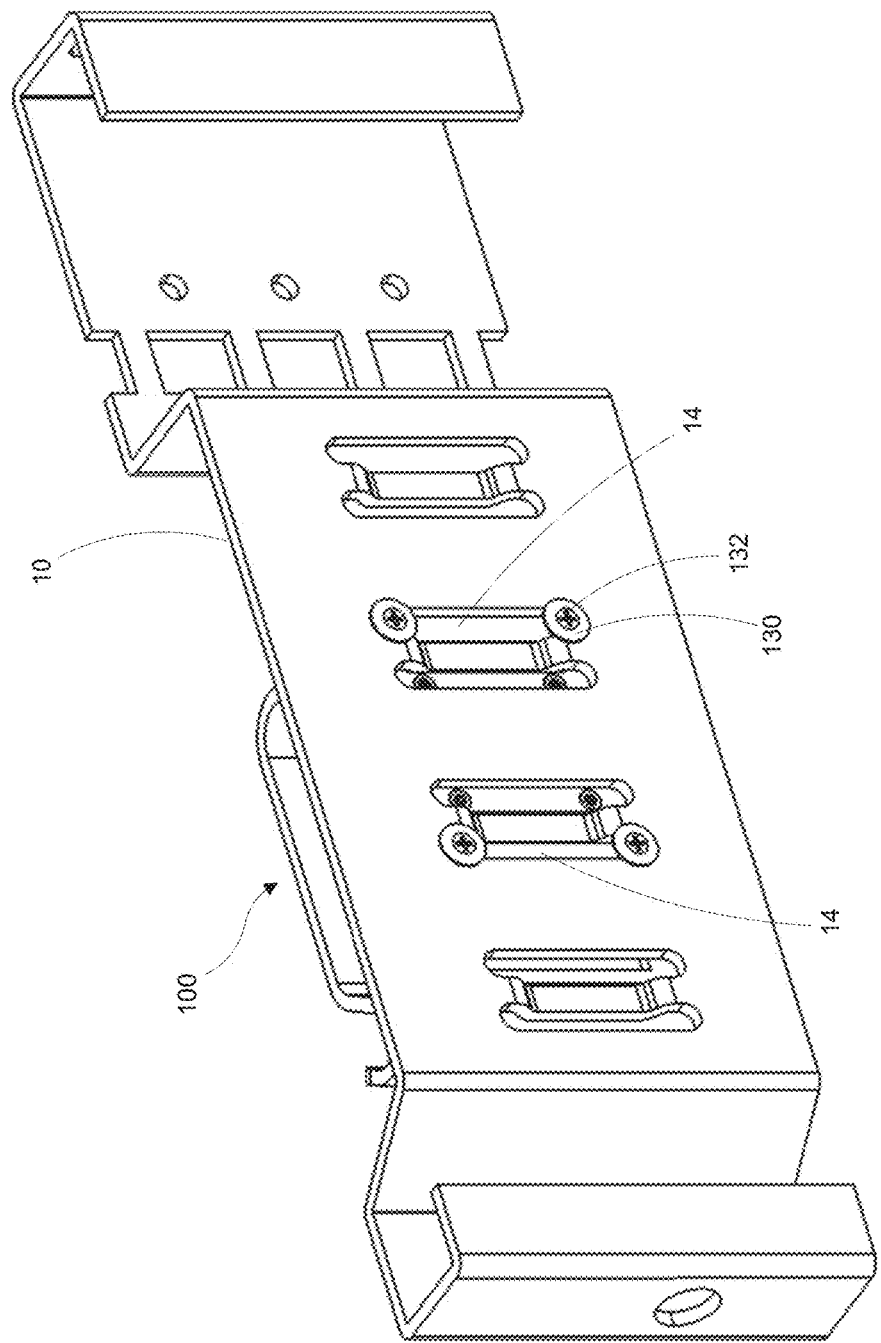
FIG. 4 is an isometric view of the cable management clip of FIG. 1 as viewed from the back side of the cable tray.

In some embodiments, a pair of apertures 122 can be formed through the base portion 102 as shown in FIG. 3. The apertures 122 are positioned to receive a corresponding mounting feature 12 of the mounting surface 16 (FIG. 1). In some embodiments, a first pair of mounting holes 124 are formed through the base portion 102 adjacent a first side of each of the apertures 122, wherein the first pair of mounting holes are spaced apart a first distance $D_1$. A second pair of mounting holes 125 can be positioned adjacent a second side of each of the apertures 122, wherein the second pair of mounting holes 125 are spaced apart a second distance $D_2$. In the depicted embodiment, the first distance $D_1$ is less than the second distance $D_2$. In at least one embodiment, the first distance $D_1$ is approximately 28 mm and the second distance $D_2$ is approximately 37 mm. In some embodiments, the mounting holes 124 and 125 are fitted with threaded inserts 126, which can be pressed into the mounting holes. With further reference to FIG. 4, the first and second pairs of mounting holes 124 and 125 are spaced at different distances to fit different length slots 14. The slots can be different lengths due to manufacturing tolerances and/or different suppliers. In the depicted embodiment, the length of the slots 14 is best matched by the spacing (i.e., $D_2$) of the second pair of mounting holes 125. In other applications with shorter slots, the spacing (i.e., $D_1$) of the first pair of mounting holes 124 may be a better match to the shorter slot. Mounting hardware, such as washers 130 and flat head screws 132 can be used to mount the cable management clip 100 to the cable tray 10 by engaging corresponding threaded inserts 126 (FIG. 3). Although the depicted embodiments, disclose using mounting hardware to attach the cable management clip 100 to the cable tray 10, other mounting elements can be used, such as for example and without limitation magnets, double-sided tape, cooperative hook and loop material (e.g., Velcro®), and the like.

Figure 6:
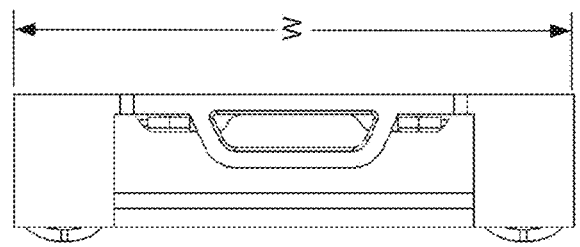
FIG. 6 is a back side view of the cable management clip of FIG. 5.
Figure 5:
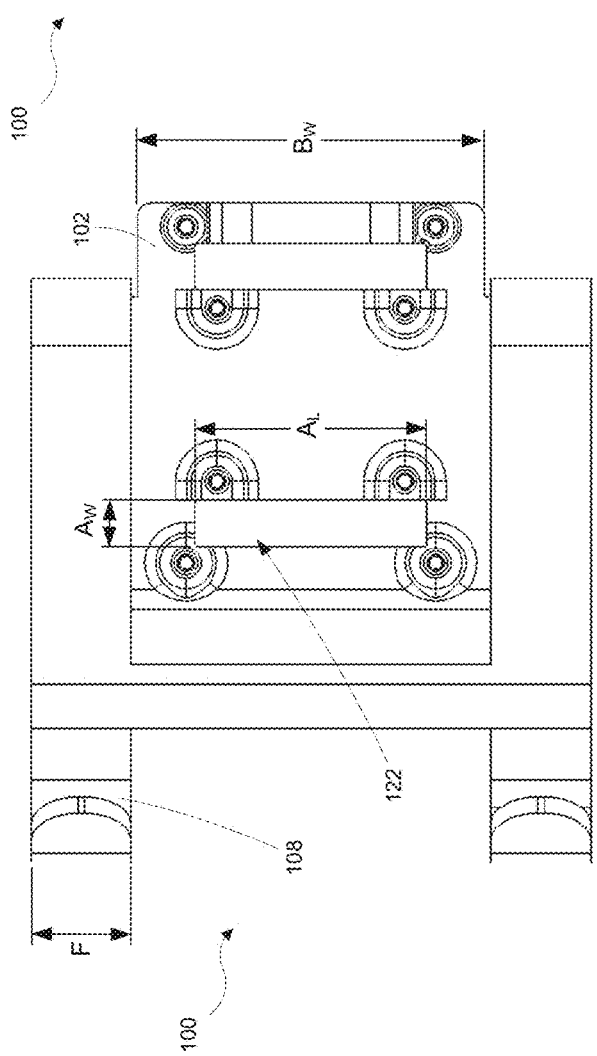
FIG. 5 is a top plan view of the cable management clip.
Figure 7:
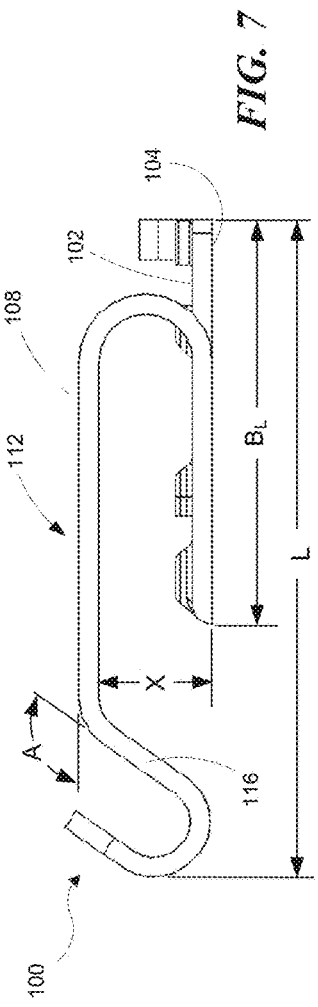
FIG. 7 is a left side view of the cable management clip of FIG. 5.

As shown in FIG. 5, the fingers 108 have a width F, which can be approximately 15 mm in some embodiments. Each aperture 122 has a length $A_L$ and a width $A_W$, which can be approximately 35 mm and 7 mm, respectively. In some embodiments, the base portion 102 can extend beyond the fingers 108 with a width $B_W$ of approximately 52 mm. With reference to FIG. 6, the overall width W of the cable management clip 100 can be approximately 84 mm in some embodiments. As shown in FIG. 7, the overall length L of the cable management clip 100 can be approximately 100 mm in some embodiments. The length $B_L$ of the base portion 102 can be approximately 60 mm in some embodiments. The distance X between the fingers 108 and the first surface 104 of the base portion 102 can be approximately 17 mm in some embodiments. As mentioned above, the retainer segment 116 extends from the middle portion 112 at an obtuse angle A, which can be approximately 135 degrees in some embodiments. Although specific angles and dimensions are disclosed herein, other suitable angles and dimensions may be used within the scope of the disclosed technology.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A cable management clip, comprising:
   a base portion, including:
      a first side configured to confront a mounting surface and a second side opposite the first side; and
      one or more apertures formed through the base portion and positioned to receive a corresponding mounting feature of the mounting surface; and
   one or more fingers, each including:
      an arcuate first end portion extending away from the base portion;
      a middle portion connected to the arcuate first end portion and extending parallel to the base portion; and
      a second end portion extending from the middle portion at a selected angle and positioned to retain one or more cables between the one or more fingers and the mounting surface; and
   a plurality of threaded inserts secured to the base portion adjacent the one or more apertures.

2. The cable management clip of claim 1, wherein the one or more fingers comprises a pair of fingers and further comprising a transverse member extending between the pair of fingers.

3. The cable management clip of claim 2, wherein the base portion, the one or more fingers, and the transverse member comprise a unitary molded construction.

4. The cable management clip of claim 1, wherein the second end portion includes a retainer segment extending at an obtuse angle from the middle portion.

5. The cable management clip of claim 4, wherein the second end portion includes a lead-in tab at least a portion of which extends parallel to the retainer segment.

6. The cable management clip of claim 1, further comprising an elongate hoop located on the base portion.

7. A cable management clip, comprising:
   a base portion, including:
      a first side configured to confront a mounting surface and a second side opposite the first side;
      one or more apertures formed through the base portion and positioned to receive a corresponding mounting feature of the mounting surface;
      a first pair of mounting holes positioned adjacent a first side of the one or more apertures, wherein the first pair of mounting holes are spaced apart a first distance; and
      a second pair of mounting holes positioned adjacent a second side of the one or more apertures, wherein the second pair of mounting holes are spaced apart a second distance different than the first distance; and
   one or more fingers, each including:
      a first end portion extending away from the base portion;
      a middle portion extending from the first end portion and parallel to the base portion; and
      a second end portion extending from the middle portion and positioned to retain one or more cables between the one or more fingers and the mounting surface.

8. The cable management clip of claim 7, wherein the one or more fingers comprises a pair of fingers and further comprising a transverse member extending between the pair of fingers.

9. The cable management clip of claim 7, wherein the first pair of mounting holes and the second pair of mounting holes each have a threaded insert secured therein.

10. The cable management clip of claim 7, wherein the second end portion includes a retainer segment extending at an obtuse angle from the middle portion.

11. The cable management clip of claim 10, wherein the second end portion includes a lead-in tab at least a portion of which extends parallel to the retainer segment.

12. The cable management clip of claim 7, further comprising an elongate hoop located on the base portion.

13. The cable management clip of claim 7, wherein the base portion and the one or more fingers comprise a unitary molded construction.

14. A cable management clip, comprising:
   a base portion, including:
      a first side configured to confront a mounting surface and a second side opposite the first side; and
      one or more apertures formed through the base portion and positioned to receive a corresponding mounting feature of the mounting surface;
   a pair of fingers, each including:
      an arcuate first end portion extending away from the base portion;
      a middle portion extending parallel to the base portion; and
      a second end portion having a retainer segment extending at an obtuse angle from the middle portion, and a lead-in tab at least a portion of which extends parallel to the retainer segment;
   a transverse member extending between the pair of fingers; and
   a plurality of threaded inserts secured to the base portion adjacent the one or more apertures.

15. The cable management clip of claim 14, further comprising an elongate hoop located on the base portion and extending parallel to the transverse member.

16. The cable management clip of claim 15, wherein the base portion, the pair of fingers, the transverse member, and the elongate hoop comprise a unitary molded construction.

17. The cable management clip of claim 15, wherein the plurality of threaded inserts comprises a first pair of inserts positioned adjacent a first side of the one or more apertures, wherein the first pair of inserts are spaced apart a first distance, and a second pair of inserts positioned adjacent a second side of the one or more apertures, wherein the second pair of inserts are spaced apart a second distance different than the first distance.

18. A cable management clip, comprising:
   a base portion, including:
      a first side configured to confront a mounting surface and a second side opposite the first side; and
      one or more apertures formed through the base portion and positioned to receive a corresponding mounting feature of the mounting surface; and
   one or more fingers, each including:
      an arcuate first end portion extending away from the base portion;
      a middle portion connected to the arcuate first end portion and extending parallel to the base portion; and
      a second end portion extending from the middle portion at a selected angle and positioned to retain one or more cables between the one or more fingers and the mounting surface, wherein the second end portion includes a retainer segment extending at an obtuse angle from the middle portion.

19. A cable management clip, comprising:

a base portion, including:
- a first side configured to confront a mounting surface and a second side opposite the first side; and
- one or more apertures formed through the base portion and positioned to receive a corresponding mounting feature of the mounting surface; and one or more fingers, each including:
- an arcuate first end portion extending away from the base portion; and
- a middle portion connected to the arcuate first end portion and extending parallel to the base portion;

a second end portion extending from the middle portion at a selected angle and positioned to retain one or more cables between the one or more fingers and the mounting surface; and an elongate hoop located on the base portion.

\* \* \* \* \*